United States Patent [19]

Lannert

[11] 3,897,490

[45] July 29, 1975

[54] HYDROXY ETHER CARBOXYLATES

[75] Inventor: Kent P. Lannert, Freeburg, Ill.

[73] Assignee: Monsanto Company, St. Louis, Mo.

[22] Filed: Dec. 19, 1973

[21] Appl. No.: 426,297

[52] U.S. Cl............. 260/535 P; 252/121; 252/132; 252/142; 252/156; 252/180; 260/484 P; 260/501.1; 260/501.17
[51] Int. Cl............................................ C07c 59/22
[58] Field of Search.......... 260/535 P, 484 P, 501.1, 260/501.17

[56] References Cited
UNITED STATES PATENTS
2,818,440  12/1957  Rust et al....................... 260/638 R FOREIGN PATENTS OR APPLICATIONS
785,632  12/1972  Belgium.......................... 260/535 P
2,248,708  4/1973  Germany......................... 260/535 P Primary Examiner—Anton H. Sutto
Assistant Examiner—Paul J. Killos
Attorney, Agent, or Firm—T. N. Wallin; J. E. Maurer; N. E. Willis

[57] ABSTRACT

Hydroxy ether carboxylates represented by the formula

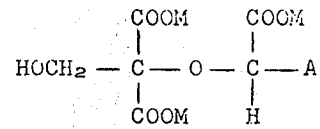

wherein M is alkali metal, ammonium or alkanol ammonium and A is hydrogen or methyl, are useful as complexing agents and detergency builders. The ester and acid forms of such compounds are useful as intermediates for production of the salts.

7 Claims, No Drawings

HYDROXY ETHER CARBOXYLATES

BACKGROUND OF THE INVENTION

This invention relates to novel hydroxy ether carboxylate salts useful as complexing agents and detergency builders and to ester and acid forms of such compounds useful as intermediates for preparation of the salts.

The utility of compounds characterized by the ability to complex various metal and alkaline earth metal ions (particularly ions such as calcium ions which contribute to "hardness" of water) in aqueous media and/or provide, in combination with various detergent surfactants, detergent formulations of enhanced cleansing ability is well recognized by those skilled in the art. Such compounds are used in water treating applications (e.g., to "soften" water) and/or as detergency builders.

Although many compounds having complexing and/or detergency builder functionality are known, the provision of novel compounds composed of only carbon, hydrogen and oxygen and having such functionality is desirable.

SUMMARY OF THE INVENTION

It is an object of this invention to provide novel compounds useful as complexing agents and/or detergency builders and intermediates for the synthesis of such compounds.

The compounds of this invention are hydroxy ether polycarboxylic acids, salts and esters whose structure, synthesis, and use will be understood from the following description of the preferred embodiments.

DESCRIPTION OF THE PREFERRED EMBODIMENTS

The compounds of the present invention are represented by the formula

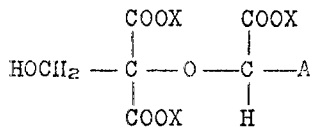

wherein X is hydrogen, alkali metal, ammonium, alkyl ammonium, containing 1 to 4 carbon atoms, alkanol ammonium containing 1 to 4 carbon atoms or an alkyl group containing from 1 to 20 carbon atoms, and A is hydrogen or methyl. Certain of the compounds of this invention will be found to have hydrate forms and claims to compounds represented by the above formula are intended to encompass both hydrated and unhydrated forms thereof.

The salt forms of the compounds of this invention are useful as complexing agents and as detergency builders. The compound

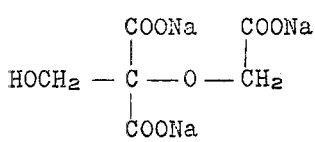

[trisodium 2-hydroxymethyl-2-(carboxymethoxy)malonate], particularly in the form of its tetrahydrate, is preferred for builder use in view of its excellent performance and easily handled crystalline form.

The ester and acid forms of the compounds of this invention are useful as intermediates for preparation of the salt forms as will be apparent from the description of methods of preparing compounds of this invention. In addition, certain of the esters (particularly those having more than 4 carbon atoms in the ester alkyl groups) will be found to exhibit plasticizer properties or, in the case of the higher alkyl (9 to 20 carbon atoms) esters, surfactant properties.

The ester forms of the compounds of this invention can be prepared by reacting an ether carboxylate ester represented by the formula

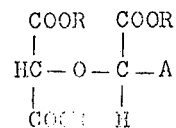

wherein R is an alkyl group containing from 1 to 20 carbon atoms with formaldehyde.

The formaldehyde can be provided directly or materials capable of providing formaldehyde under reaction conditions (e.g., paraformaldehyde, trioxane) can be utilized. Methanol stabilized aqueous formaldehyde solutions (formalin) provide a particularly convenient source of formaldehyde.

The reaction is conducted in a medium sufficiently basic to deprotonate but not so basic as to substantially (more than 30 percent) hydrolyze or saponify the ether carboxylate ester. This degree of basicity is conveniently obtained with a weak base such as potassium bicarbonate. Preferred reaction temperatures are in the range of 15° to 30°C although higher or lower temperatures (generally in the range of 5° to 200°C) can be utilized if desired. At higher temperatures, appropriate pressure or reflux means are desirably employed.

The starting ether carboxylate ester used in the foregoing reaction can be prepared by reacting a chloromalonate

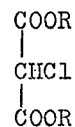

with the sodium salt of an α-hydroxy ester

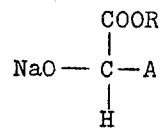

This reaction is conveniently conducted in an inert solvent such as 1,2-dimethoxyethane or tetrahydrofuran at reflux temperatures under ambient pressure. The ester products can be isolated in purified form by conventional distillation procedures.

In accordance with the above procedure, the triethyl 2-hydroxymethyl-2-(carboxymethoxy)malonate ester compound of this invention can be obtained by reaction of formaldehyde with triethyl 2-(carboxymethoxy)malonate prepared by reacting sodium ethyl glycolate with diethyl chloromalonate.

Similarly, triethyl 2-hydroxymethyl-2-(1-carboxyethoxy)malonate can be obtained by reaction of formaldehyde with triethyl 2-(1-carboxyethoxy)malonate prepared by reacting sodium ethyl lactate with diethyl chloromalonate.

The corresponding alkali metal salts are readily obtained by conventional saponification techniques. The corresponding ammonium and alkanol ammonium salts are more easily obtained by neutralization of the acid forms of the compounds of this invention which are obtained by acidulation of the salt with a strong acid, e.g., HCl, $H_2SO_4$, or a strong acid ion exchange resin.

The hydroxyether polycarboxylate salts of this invention are useful as agents for complexing metal and/or alkaline earth metal ions in aqueous media. The amount of polycarboxylate required to effectively complex the ions in a given system will depend, to some extent, on the particular polycarboxylate salt being used and the particular metal or alkaline earth metal ions in the aqueous media. Generally, complexing is more effective in basic solution. Optimum conditions and amounts of complexing agent can readily be determined by routine experimentation.

The hydroxy ether polycarboxylate salts are also useful as builders in detergent formulations. Generally, the use of the alkali metal salts, particularly the sodium salt, is preferred. However, in some formulations (such as liquid formulations where greater builder solubility is required) the use of ammonium or alkanol ammonium salts may be desirable.

The detergent formulations will contain at least 1 percent by weight and preferably at least 5 percent by weight of the hydroxy ether polycarboxylate salts of this invention. In order to obtain the maximum advantages of the builder compositions of this invention, the use of from 5 to 75 percent of these polycarboxylate salts is particularly preferred. The hydroxy ether polycarboxylate salt compounds of this invention can be the sole detergency builder or these compounds can be utilized in combination with other detergency builders which may constitute from 0 to 95 percent by weight of the total builders in the formulation. By way of example, builders which can be employed in combination with the novel builder compounds of this invention include water soluble inorganic builder salts such as alkali metal polyphosphates, i.e., the tripolyphosphates and pyrophosphates, alkali metal carbonates, borates, bicarbonates and silicates and water soluble organic builders including amino polycarboxylic acids and salts such as alkali metal nitrilotriacetates, cycloalkane polycarboxylic acids and salts, ether polycarboxylates (for example, the salt forms of the esters reacted with formaldehyde to prepare the ester forms of the compounds of the present invention), alkyl polycarboxylates, epoxy polycarboxylates, tetrahydrofuran polycarboxylates such as 1,2,3,4 or 2,2,5,5 tetrahydrofuran tetracarboxylates, benzene polycarboxylates, oxidized starches, amino (trimethylene phosphonic acid) and its salts, diphosphonic acids and salts (e.g., methylene diphosphonic acid; 1-hydroxy ethylidene diphosphonic acid) and the like.

The detergent formulations will generally contain from 5 to 95 percent by weight total builder (although greater or lesser quantities may be employed if desired) which, as indicated above, may be solely the hydroxy ether polycarboxylate or salt compounds of this invention or mixtures of such compounds with other builders. The total amount of builder employed will be dependent on the intended use of the detergent formulation, other ingredients of the formulation, pH conditions and the like. For example, general laundry powder formulations will usually contain 20 to 60 percent builder; liquid dishwashing formulations 11 to 12 percent builder; machine dishwashing formulations 60 to 90 percent builder. Optimum levels of builder content as well as optimum mixtures of builders of this invention with other builders for various uses can be determined by routine tests in accordance with conventional detergent formulation practice.

The detergent formulations will generally contain a water soluble detergent surfactant although the surfactant ingredient may be omitted from machine dishwashing formulations. Any water soluble anionic, nonionic, switterionic or amphoteric surfactant can be employed.

Examples of suitable anionic surfactants include soaps such as the salts of fatty acids containing about 9 to 20 carbon atoms, e.g., salts of fatty acids derived from coconut oil and tallow; alkyl benzene sulfonates--particularly linear alkyl benzene sulfonates in which the alkyl group contains from 10 to 16 carbon atoms; alcohol sulfates; ethoxylated alcohol sulfates; hydroxy alkyl sulfonates; alkyl sulfates and sulfonates; monoglyceride sulfates; acid condensates of fatty acid chlorides with hydroxy alkyl sulfonates and the like.

Examples of suitable nonionic surfactants include alkylene oxide (e.g., ethylene oxide) condensates of mono and polyhydroxy alcohols, alkyl phenols, fatty acid amides, and fatty amines; amine oxides; sugar derivatives such as sucrose monopalmitate; long chain tertiary phosphine oxides; dialkyl sulfoxides; fatty acid amides, (e.g., mono or diethanol amides of fatty acids containing 10 to 18 carbon atoms), and the like.

Examples of suitable zwitterionic surfactants include derivatives of aliphatic quaternary ammonium compounds such as 3-(N,N-dimethyl-N-hexadecylammonio) propane-1-sulfonate and 3-(N,N-dimethyl-N-hexadecylammonio)-2-hydroxy propane-1-sulfonate.

Examples of suitable amphoteric surfactants include betains, sulfobetains and fatty acid imidazole carboxylates and sulfonates.

It will be understood that the above examples of surfactants are by no means comprehensive and that numerous other surfactants are known to those skilled in the art. It will be further understood that the choice and use of surfactants will be in accordance with well understood practices of detergent formulation. For example, anionic surfactants, particularly linear alkyl benzene sulfonate are preferred for use in general laundry formulations, whereas low foaming nonionic surfactants are preferred for use in machine dishwashing formulations.

The quantity of surfactant employed in the detergent formulations will depend on the surfactant chosen and the end use of the formulation. In general, the formulations will contain from 5 to 50 percent surfactant by weight, although as much as 95 percent or more surfactant may be employed if desired. For example, general laundry powder formulations normally contain 5 to 50 percent, preferably 15 to 25 percent surfactant; machine dishwashing formulations 0.5 to 5 percent; liquid dishwashing formulations 20 to 45 percent. The weight ratio of surfactant to builder will generally be in the range of from 1;12 to 2:1.

In addition to builder and surfactant components, detergent formulations may contain fillers such as sodium sulfate and minor amounts of bleaches, dyes, optical brightners, soil anti-redeposition agents, perfumes and the like.

In machine dishwashing compositions the surfactant will be a low-foaming anionic surfactant which will constitute 0 to 5 percent of the formulation.

The term "low-foaming" surfactant connotes a surfactant which, in the foaming test described below, reduces the revolutions of the washer jet-spray arm during the wash and rinse cycles less than 15 percent, preferably less than 10 percent.

In the foaming test, 1.5 grams of surfactant is added to a 1969 Kitchen-Aid Home Dishwasher, Model No. KOS-16, manufactured by Hobart Manufacturing Co. which is provided with means for counting revolutions of the washer jet-spray arm during wash and rinse cycles. The machine is operated using distilled water feed at a machine entrance temperature of 40°C. The number of revolutions of the jet-spray arm during the wash and rinse cycles is counted. The results are compared with those obtained by operation of the machine using no surfactant charge and percentage decrease in number of revolutions is determine.

The surfactant should, of course, be compatible with the chlorine containing component hereinafter discussed. Examples of suitable nonionic surfactants include ethoxylated alkyl phenols, ethoxylated alcohols (both mono- and di-hydroxy alcohols), polyoxyalkylene glycols, aliphatic polyethers and the like. The widely commercially utilized condensates of polyoxypropylene glycols having molecular weights of from about 1,400 to 2,200 with ethylene oxide (the ethylene oxide constituting 5 to 35 weight percent of the condensate) are, for example, advantageously used in the machine dishwashing formulations of this invention.

Suitable low-foaming anionic surfactants include alkyldiphenyl ether sulfonates such as sodium dodecyl diphenyl ether disulfonates and alkyl naphthalene sulfonates.

Mixtures of suitable low-foaming surfactants can be utilized if desired.

In addition, machine dishwashing formulations will contain sufficient chlorine providing compound to provide 0.5 to 2 percent available chlorine. For example, the formulation may contain from 0.5 to 5 percent, preferably 1 to 3 percent of a chlorocyanurate or from 10 to 30 percent chlorinated trisodium phosphate. Suitable chlorocyanurates are sodium and potassium dichlorocyanurate; [(mono-trichloro) tetra-(monopotassium dichloro)] penta-isocyanurate; (mono-trichloro) (mono-potassium dichloro) di-isocyanurate.

Machine dishwashing compositions should additionally contain from 5 to 30 percent soluble sodium silicate having an $SiO_2$ to $Na_2O$ mole ratio of from 1:1 to 3.2:1 preferably about 2.4:1 to inhibit corrosion of metal parts of dishwashing machines and provide overglaze protection to fine china.

Machine dishwashing compositions will generally contain at least 10 percent, preferably at least 20 percent builder, up to a maximum of about 90 percent builder. The new builder compounds of this invention should constitute at least 5 percent of the weight of the machine dishwashing formulation in order to obtain the full effects of their inherent characteristics.

The invention is further illustrated by the following examples, wherein all parts and percentages are by weight unless otherwise indicated.

EXAMPLE I

Diethyl chloromalonate (97 parts) is added to a slurry of 72 parts sodium ethyl glycolate in 350 parts 1,2-dimethoxyethane over a two-hour period, the temperature of the reaction mix being maintained in the range of 50° to 60°C. The resulting mixture is refluxed until a neutral pH is obtained. This reaction yields triethyl 2-(carboxymethoxy)malonate which is isolated by removal of the 1,2-dimethoxyethane solvent; dissolution in ether; washing in succession, with 5% $NaHCO_3$, and water; drying over anhydrous $MgSO_4$; removal of the ether under reduced pressure; and fractional distillation with the ester product being collected at 119° to 120°C, 0.05 mm. Hg.

A mixture is formed of 223.5 parts of the triethyl 2-(carboxymethoxy)malonate; 140 parts of 37 percent formalin and 10 parts potassium bicarbonate. The reaction is initially exothermic and the temperature is maintained in the range of 20° to 35°C by cooling. The mixture is stirred for 72 hours. The triethyl 2-hydroxymethyl-2(carboxymethoxy)malonate product is diluted with 150 parts ethyl ether; washed three times with 100 parts 5 percent sodium bicarbonate solution and three times with 100 parts water. The etheral solution is dried over anhydrous calcium sulfate and magnesium sulfate and the ether evaporated to isolate purified triethyl 2-hydroxymethyl-2-(carboxymethoxy)malonate.

The identity of this ester is confirmed by a hydrogen nuclear magnetic resonance spectrum (as determined in a deuterated chloroform solution) which exhibits a singlet at about 5.0 ppm (1 proton), a singlet at 4.57 ppm (2 protons); a quartet 4.38 ppm (4 protons); a quartet at 4.35 ppm (2 protons); a singlet at 4.13 ppm (2 protons); a triplet at 1.32 ppm (9 protons).

About 50 parts of the triethyl 2-hydroxymethyl-2-(carboxymethoxy)malonate are stirred with 100 parts 25 percent aqueous sodium hydroxide solution and 50 parts ethyl alcohol for about 2 hours, the temperature of the mixture being maintained at about 25°C by means of an ice bath. Trisodium 2-hydroxymethyl-2-(carboxymethoxy)malonate tetrahydrate is isolated and purified by addition of methanol to precipitate the product; dissolving the product in water and reprecipitating by methanol addition followed by drying under vacuum at 25°C. The identity of this product is confirmed by elemental analysis corresponding to the theoretical structure and by a hydrogen nuclear magnetic resonance spectrum (determined in deuterium oxide) exhibiting two singlets at about 4.17 and 4.35 each corresponding to two protons.

The trisodium 2-hydroxymethyl-2-(carboxymethoxy)malonate tetrahydrate is a white crystalline salt having the following X-ray diffraction pattern:

| Diffraction Angle $2\theta$ | I/18 |
| --- | --- |
| 2.594 | 20 |
| 2.704 | 25 |
| 2.864 | 15 |
| 3.066 | 13 |

| Diffraction Angle 2θ | I/I8 |
| --- | --- |
| 3.092 | 20 |
| 3.124 | 18 |
| 3.463 | 20 |
| 4.019 | 15 |
| 4.643 | 50 |
| 5.862 | 15 |
| 9.302 | 100 |

Heating the tetrahydrate at about 150°C yields anhydrous trisodium 2-hydroxymethyl-2-(carboxymethoxy)malonate.

Passing a 25 percent solution of trisodium 2-hydroxymethyl-2-(carboxymethoxy)malonate in deionized water through a column packed with a strong acid ion exchange resin (sulfonated polystyrene marketed by Fisher Scientific Co. under the Trademark Rexyn 101) yields 2-hydroxymethyl-2-(carboxymethoxy)malonic acid.

EXAMPLE II

About 136 parts diethyl chloromalonate is added to a slurry of 98 parts sodium ethyl lactate in 400 parts 1,2-dimethoxyethane. The mixture is heated at 70°C for 8 hours. The triethyl 2-hydroxymethyl-2-(1-carboxyethoxy)malonate product is isolated by evaporating the 1,2-dimethoxyethane; dissolving the residue in chloroform; washing with 5% NaHCO$_3$ and then water; drying over MgSO$_4$; evaporating the chloroform and fractionally distilling the residue, the product being collected at 94° to 96°C, 0.03 mm. Hg.

A mixture is formed of 50 parts of the triethyl 2-(1-carboxyethoxy)malonate, 30 parts of 37 percent formalin solution, and 2 parts potassium bicarbonate. The mixture is stirred for 70 hours, the temperature being maintained at about 25°C. Triethyl 2-hydroxymethyl-2-(1-carboxyethoxy)malonate product is extracted from the reaction mixture with 300 parts chloroform; washed with water, dried over magnesium sulfate; the chloroform evaporated.

Twenty four parts of a 50% aqueous solution of sodium hydroxide is added dropwise to an ice-bath cooled mixture of 31 parts of the triethyl 2-hydroxymethyl-2-(1-carboxyethoxy)malonate in 25 parts water. The reaction mixture is stirred for 2 hours. Addition of methanol results in separation of trisodium 2-hydroxymethyl-2-(1-carboxyethoxy)malonate which is isolated by filtration, washed with acetone and dried in vacuo at 45°C.

The identity of the product as trisodium 2-hydroxymethyl-2-(1-carboxyethoxy)malonate is confirmed by a hydrogen nuclear magnetic resonance spectrum (determined in deuterium oxide) exhibiting a doublet at about 1.55 ppm (3 protons) and a multiplet at about 3.9-4.3 ppm (3 protons).

Passing a 25 percent solution of the trisodium 2-hydroxymethyl-2-(1-carboxyethoxy)malonate in deionized water through a column packed with a strong acid ion exchange resin (sulfonated polystyrene marketed by Fisher Scientific Co. under the Trademark Rexyn 101) yields 2-hydroxymethyl-2-(1-carboxyethoxy)malonic acid.

EXAMPLE III

Trisodium 2-hydroxymethyl-2-(carboxymethoxy)malonate and trisodium 2-hydroxymethyl-2-(1-carboxyethoxy)malonate are tested for sequestration function using the procedures described by Matzner, et al., "Organic Builder Salts as Replacements for Sodium Tripolyphosphate," *Tenside Detergents*, 10, Heft 3, pages 119–125 (1973).

The sequestration value (intensity multiplied by capacity expressed as a percentage of sodium tripolyphosphate sequestration value) of trisodium 2-hydroxymethyl-2-(carboxymethoxy)malonate is 103 percent.

The sequestration value of trisodium 2-hydroxymethyl-2-(1-carboxyethoxy)malonate is 75 percent.

EXAMPLE IV

Detergent formulations containing the percent builder shown in Table I below; 17 percent linear alkylbenzene sulfonate having an average molecular weight of about 230; 6 percent sodium silicate; remainder, sodium sulfate are prepared. The formulations are tested by washing identically soiled fabric swatches (indicated in the Table) in water of 200 ppm hardness at 49°C containing 0.15 percent detergent formulation using identical washing techniques. The reflectivity of the soiled swatches before and after washing is measured instrumentally and the difference reported in Table I as Δ Rd. High Δ Rd values are indicative of correspondingly high detergency effectiveness.

TABLE I

| Builder | Cotton Fabric ΔRd % Builder | | | Polyester/Cotton Fabric ΔRd % Builder | | |
| --- | --- | --- | --- | --- | --- | --- |
| | 50 | 37.5 | 25 | 50 | 37.5 | 25 |
| none (a filler-sodium sulfate-is used in place of builder) | <13 | <13 | <13 | <5 | <5 | <5 |
| trisodium 2-hydroxymethyl-2-(1-carboxyethoxy) malonate | 21.4 | 17.2 | 13.7 | 9.4 | 8.2 | 6.4 |
| trisodium 2-hydroxymethyl-2-(carboxymethyoxy)malonate | 27.6 | 20.4 | 15.0 | 10.1 | 9.3 | 6.9 |

The data presented in Table I show the salt forms of the compounds of this invention to be effective detergency builders.

What is claimed is:
1. Compounds represented by the formula

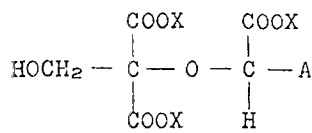

wherein X is selected from the group consisting of hydrogen, alkali metal, ammonium, alkyl and alkanol ammonium wherein the alkyl group contains from 1 to 4 carbon atoms, and alkyl groups containing from 1 to 20 carbon atoms and A is selected from the group consisting of hydrogen and methyl.

2. The compound of claim 1 wherein X is alkali metal.
3. The compound of claim 1 wherein A is hydrogen.
4. The compound of claim 3 wherein X is alkali metal.
5. The compound of claim 4 wherein X is sodium.
6. Trisodium 2-hydroxymethyl-2-carboxymethoxymalonate tetrahydrate.
7. A method of making a compound represented by the formula

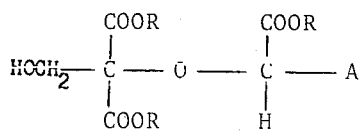

wherein R is an alkyl group containing from 1 to 20 carbon atoms and A is selected from the group consisting of hydrogen and methyl, said method consisting essentially of reacting an ether carboxylate compound represented by the formula

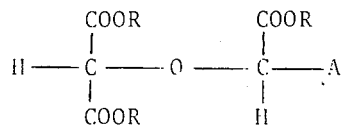

wherein A and R are as defined above with formaldehyde in a medium sufficiently basic to deprotinize said ether carboxylate without substantial hydrolysis or saponification thereof.

* * * * *

UNITED STATES PATENT OFFICE
CERTIFICATE OF CORRECTION

PATENT NO. : 3,897,490
DATED : July 29, 1975
INVENTOR(S) : Kent P. Lannert

It is certified that error appears in the above-identified patent and that said Letters Patent are hereby corrected as shown below:

Column 4, line 17, "switterionic" should be --- zwitterionic ---.

Column 5, line 2, "1;12" should be --- 1:12 ---.

Column 5, line 27, "determine." should be --- determined. ---.

Column 6, line 64, "I/18" should be --- I/Io ---.

Signed and Sealed this second Day of December 1975

[SEAL]

Attest:

RUTH C. MASON
*Attesting Officer*

C. MARSHALL DANN
*Commissioner of Patents and Trademarks*